United States Patent

[11] 3,629,037

[72] Inventors Kohei Masuda;
 Taku Uchigaki; Masakazu Arai, all of Yokkaichi-shi, Japan
[21] Appl. No. 702,087
[22] Filed Jan. 31, 1968
[45] Patented Dec. 21, 1971
[73] Assignee Mitsubishi Petrochemical Co., Ltd. Tokyo, Japan
[32] Priority Jan. 31, 1967
[33] Japan
[31] 42/5968

[54] PROCESS FOR PRODUCTION OF LAMINATED FILM HAVING REDUCED NECK-IN-FORMING PROPERTY
 6 Claims, 8 Drawing Figs.
[52] U.S. Cl. ................................................. 156/244, 156/306, 117/72
[51] Int. Cl. .................................................. B29c 19/00
[50] Field of Search ...................................... 156/244, 306; 161/265, 270; 260/897; 117/72

[56] References Cited
UNITED STATES PATENTS

| | | | |
|---|---|---|---|
| 2,932,323 | 4/1960 | Aries | 156/244 X |
| 3,046,155 | 7/1962 | Reinke | 156/244 X |
| 3,161,560 | 12/1964 | Paquin et al. | 156/244 X |
| 3,190,781 | 6/1965 | Metz | 156/244 |
| 3,196,063 | 7/1965 | Paquin et al. | 156/244 X |
| 3,230,126 | 1/1966 | Craver | 156/244 |
| 3,341,388 | 9/1967 | Bunyea | 156/244 |
| 3,371,002 | 2/1968 | Reddeman | 156/244 |
| 3,416,986 | 12/1968 | Carley | 156/244 |
| 3,418,396 | 12/1968 | Edwards et al. | 156/244 X |
| 3,448,000 | 6/1969 | Paquin et al. | 156/244 X |

Primary Examiner—Carl D. Quarforth
Assistant Examiner—Stephen J. Lechert, Jr.
Attorney—Sughrue, Rothwell, Mion, Zinn & Macpeak ABSTRACT: A process for the production of laminated film which comprises extruding from an extruder die a melted resin having a high neck-in-forming property together with another melted resin having a lower neck-in-forming property, then laminating the extruded resin in the form of a melted compounded film with a base material.

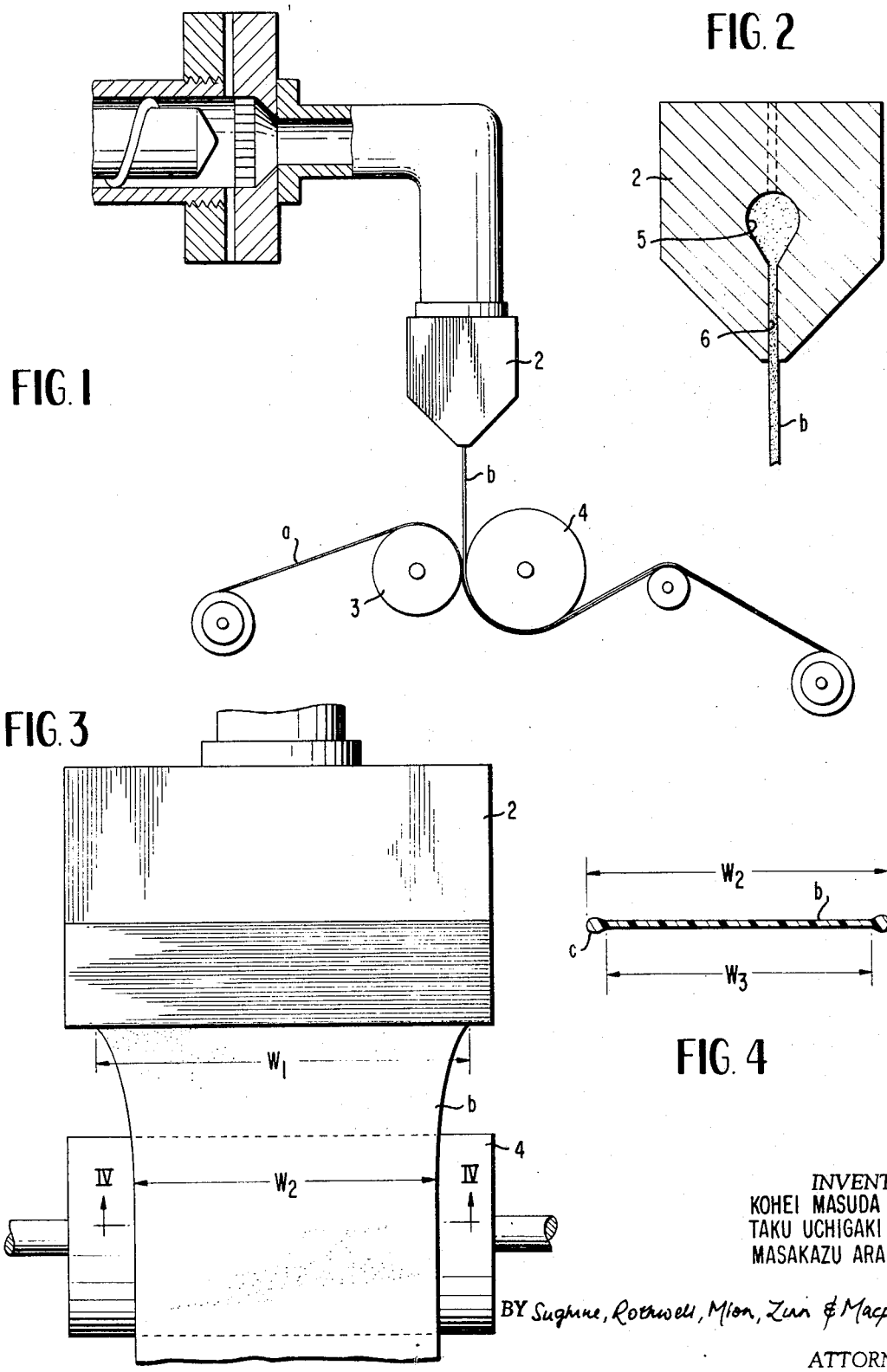

PATENTED DEC 21 1971 3,629,037

PROCESS FOR PRODUCTION OF LAMINATED FILM HAVING REDUCED NECK-IN-FORMING PROPERTY

BACKGROUND OF THE INVENTION

1. Field of the Invention

The present invention relates to a process for the production of laminated film by the extrusion-laminating of thermoplastic resins. More particularly, it relates to a process for the production of laminated film having reduced neck-in-forming properties.

2. Description of the Prior Art

In general, laminated film is produced by the use of such a conventional type extrusion-laminating apparatus as described in FIG. 1, which apparatus comprises extruder 1, die 2 fitted to extruder 1, and press rolls consisting of pinch roll 3 and metal roll 4 in pairs. In conducting the lamination of a thermoplastic resin with a base material, such as paper and cellophane, resin film $b$ extruded from manifold 5 of die 2 through slit 6 is still maintained in the melted state, so that the extruded resin film $b$ which has once come out of the slit in the slit width of $W_1$ of die 2 shrinks widthwise by the action of surface tension into a width $W_2$ when it is about to be laminated with the base material by pressure between pinch roll 3 and metal roll 4. Both edges $cc$ of the resin film $b$ will come to have a thickness more than several times greater than that of other portions as seen in FIG. 3 and FIG. 4 in which the cross section is shown on the line IV—IV in FIG. 3. This phenomenon is known as "neck-in" and results in the considerable loss of product material because these thickened edges must be cut off as waste in order to give a product of uniform thickness. Moreover, the film having such thickened edges often tends to stick on and wind around the press roll since thicker edges $cc$ have greater heat capacity and hence give rise to less temperature loss during working than that of other portions.

The neck-in troubles are especially significant when polypropylene or high-density polyethylene is used as the thermoplastic resin, and the use of such resins is much more uneconomical in terms of product yield than other resins having relatively less neck-in-forming properties, such as low-density polyethylene. Thus, the characteristic features of polypropylene and high-density polyethylene have not been sufficiently utilized in the field of extrusion lamination.

The object of this invention is to provide laminated film having reduced neck-in-forming properties. Another object of this invention is to eliminate the troubles of the sticking of the film to the press rolls due to thickened edges.

SUMMARY OF THE INVENTION

The process of this invention comprises compounding a resin of high neck-in-forming property, e.g. polypropylene and high-density polyethylene, with a resin of lower neck-in-forming property; both resins may be of the same kind, in the melted state, then press-laminating a base material with the compounded film-shaped resin. More particularly, the process comprises separately pouring down the melted resin of high neck-in-forming property and the melted resin of lower neck-in-forming property each from the slit in the extruder die, combining both melted flows and extruding as a melted compounded film, then press-laminating with the base material. In another embodiment of the process of this invention, the melted resin of higher neck-in-forming property and the melted resin of lower neck-in-forming property are separately extruded from the slits of the extruder die, and they are combined at the location just below the outlet of each slit into a melted compounded film and then laminated with the base material thereby to reduce neck-in to a great extent.

BRIEF DESCRIPTION OF THE DRAWINGS

A better understanding of the present invention will be attained from a review of the drawings accompanying the present application, in which:

FIG. 1 represents a conventional type extrusion-laminating apparatus;

FIG. 2 represents a conventional type extruder die;

FIG. 3 represents a resin film exhibiting "neck-in" properties;

FIG. 4 is a cross section of FIG. 3;

DETAILED DESCRIPTION OF THE INVENTION

Figure 5:
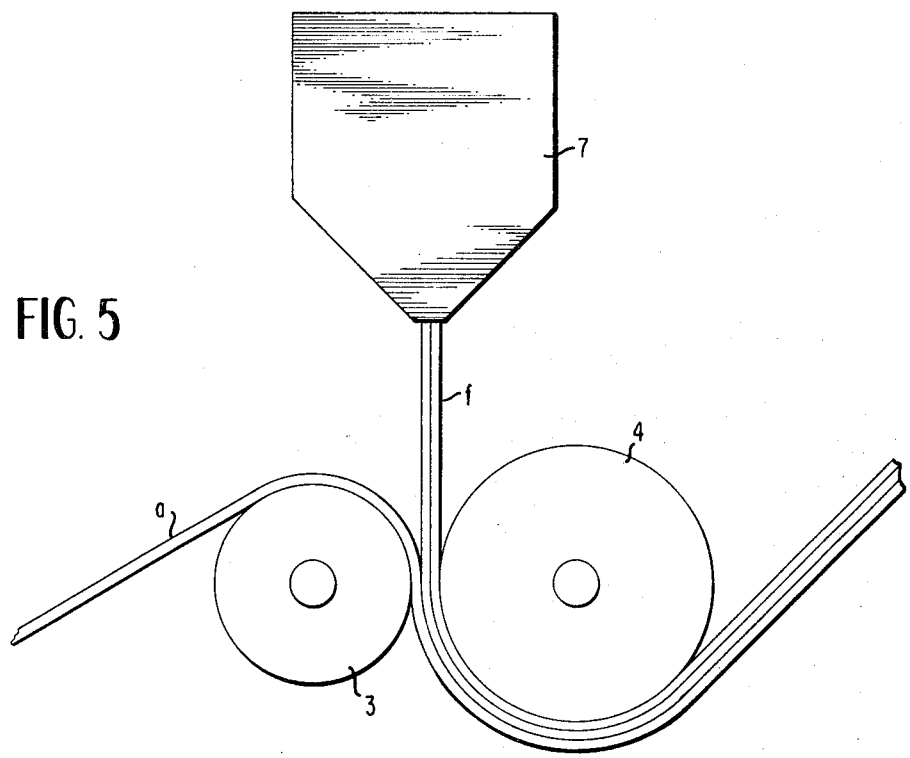
FIGS. 5 and 6 represent an extrusion die for carrying out the process of the present invention.
Figure 6:
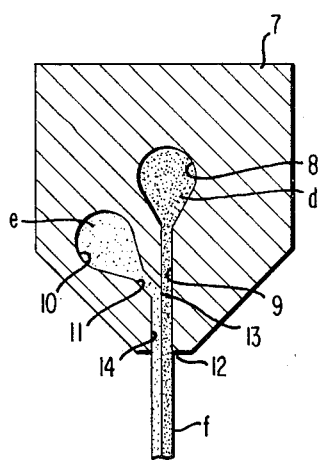

The operation of the process of this invention will be more fully explained in reference to the attached drawings of FIG. 5 and 6.

Die 7 to be fitted to the extruder has slit 9 connected to manifold 8 and slit 11 connected to manifold 10 as shown in FIG. 6. Both slits are combined together at junction 13 in front of outlet orifice 12. There is also provided a parallel passage 14 between outlet 12 and junction 13, said passage 14 having a gap size of the total of the gaps of slit 9 and slit 11. Melted resin $d$ having greater neck-in-forming property is allowed to flow down from manifold 8 through slit 9, and melted resin $e$ having lower neck-in-forming property is passed from manifold 10 through slit 11. Both melted flows are combined at junction 13 and passed through parallel line 14, then finally extruded at orifice outlet 12 as melted compounded film $f$.

By operating in this way, a laminated film is formed having much more uniform thickness than those obtained in the conventional processes wherein a resin of high neck-in-forming property is extruded alone into film shape and laminated with a basic material. In other words, it is possible to reduce neck-in and hence to improve the product yield to a remarkable extent.

The extruder die to be used in the process of this invention may be designed in a variety of modified types other than as shown in FIG. 6.

Figure 7:
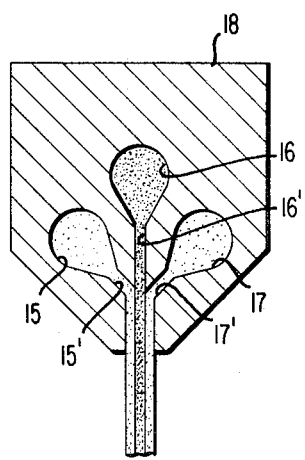
FIG. 7 represents a die having three separated manifolds with communicating slits and an inner joint at which melted resin flows may be combined.
Figure 8:
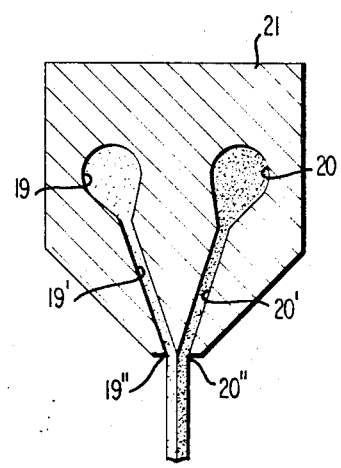
FIG. 8 is a die having separated manifolds with communicating slits ending at separated orifice outlets whereby melted resin flows may be combined at the place directly beneath the outlets.

In one example, it may be made into die 18 having three separated manifolds 15, 16 and 17 each connected to slits 15', 16' and 17', and having an inner joint at which melted resin flows are combined together, as illustrated in FIG. 7. In another example, die 21 may have separated manifolds 19 and 20 each connected to slits 19' and 20' ending at separated orifice outlets 19" and 20", and the melted resin flows are combined together at the place directly beneath the outlets 19" and 20", as illustrated in FIG. 8.

The degree of neck-in-forming property is not only defined as to resins of different kinds, but also defined according to the value of specific gravity in the same resin. For instance, the resin having higher specific gravity exhibits increased neck-in-forming property and the resin with lower specific gravity shows lower neck-in-forming property. The neck-in-forming property is also affected by the extrusion temperature, even in using a resin of the same kind and of the same specific gravity. Usually, those extruded at higher temperature will have increased neck-in-forming property, whereas those extruded at lower temperature will have a lower neck-in-forming property. It is, therefore, possible to prepare a compounded film consisting of the same resin in which the one is extruded at a higher temperature and the other is extruded at a lower temperature.

A number of combinations between the resins having higher neck-in-forming property and the resins having lower neck-in-forming property may be used in the practice of the present invention. Examples of the former type resins include polypropylene, medium- and low-pressure polyethylenes, high-pressure polyethylene having relatively high specific gravity, etc. The latter type resins typically include high-pressure polyethylene having relatively low-specific gravity.

Examples of the combination of resins in the compounded film to be used in accordance with the process of this invention are polypropylene/low-density polyethylene/substrate, high-density polyethylene/low-density polyethylene/substrate, polyester/low-density polyethylene/substrate, polyvinylidene chloride/low-density polyethylene/substrate and the like.

Even using resins of the same kind, the combination of high-temperature extrusion of high neck-in-forming property with low-temperature extrusion of lower neck-in-forming property may be possible and attain excellent adhesion at a high-temperature extrusion side as well as reduction in the neck-in-forming property at the low-temperature extrusion side by selecting the high-temperature extrusion side as the adhesion side with the matrix surface.

Two types of resins each differing in the neck-in-forming property may be applied on either side to the basic material, i.e., they may be laminated with the basic material either inside or outside the basic material. The neck-in-forming property will not be influenced in either case including the case where the resin of high neck-in-forming property is interposed between the basic material and the resin of lower neck-in-forming property, or where it is laminated outside the resin of lower neck-in-forming property with respect to the basic material. Therefore, the determination of which resin in the two layers should be applied inside or outside the basic material can be made according to such conditions as the strength of adhesion between the basic material and the resin surface, the property required as a compounded film (e.g., heat sealing property) and the like.

In accordance with the process of this invention, it is possible to improve the product yield to a great extent and also possible to conduct the resin heating at a possibly lower temperature, as long as good adhesion can be maintained in the production of laminated film wherein the characteristic features of the resin having high neck-in-forming property is advantageously utilized. Moreover, it is also possible to eliminate the trouble in the winding step due to neck-in because the neck-in is greatly reduced so as to produce laminated film having uniform thickness over wide areas. Other advantages of the process of this invention will be apparent from the description of examples set forth below.

EXAMPLE 1

The lamination according to the process of this invention was carried out by using polypropylene made by Mitsubishi Petrochemical Co., Ltd. (melt index = 20, isotactic index = 95) as a laminating resin and craft paper as the substrate. For the comparison, polypropylene alone is extruded by using a conventional-type extruder die as shown in FIG. 2 and laminated with craft paper $a$. Polypropylene is also extruded according to the process of this invention, from manifold 8 and slit 9 together with ethylene-vinyl acetate copolymer, made by Mitsubishi Petrochemical Co. Ltd., extruded separately from manifold 10 and slit 11, to form melted compounded film $f$ which was thereafter laminated with craft paper $a$. The results of these tests are given in table 1.

The tests were carried out according to the following data:
Tests No. 1 and No. 2 (Conventional Process)
Extruder: Diameter = 2½ inches, length/diameter = 24
Die: Slit width = 600 mm.
Air Gap (distance between die and press roll): 75 mm.
Extrusion Rate: 600 g./min.
Winding Speed: 40 m./min.
Tests No. 3 and No. 4 (Process of this Invention)
Extruder:
  For $i$ Diameter = 2½ inches, length/diameter = 24
  For $ii$ Diameter = 40 mm. length/diameter = 24
Die: The type used was as shown in FIG. 6
  For $i$ Slit width = 600 mm.
  For $ii$ Slit width = 600 mm.
  The substrate $a$ was adhered at the side of layer $ii$.
Air Gap: 75 mm.
Extrusion rate:
  Polypropylene 400 g./min.
  Ethylene-vinyl acetate copolymer ($ii$) 200 g./min.
Winding Speed: 40 m./min.
Tests No. 5 and No. 6 (Process of this Invention)
The working conditions were the same as tests No. 3 and No. 4 except as follows:
Die:
  For $i$ Slit Width = 600 mm.
  For $ii$ Slit Width = 608 mm.
  (The width of slit for $ii$ was extended towards both sides each 4 mm. wider than that of slit for $i$)

TABLE 1

| Processes | Test No. | Resins | Working temp., °C. | Substrate | Neck, in mm. $W_1-W_2$ | Neck, in mm. $W_1-W_3$ | Adhesion |
|---|---|---|---|---|---|---|---|
| Conventional | 1 | Polypropylene ($i$) | 300 | Craft paper | 100 | 180 | Good. |
|  | 2 | do | 260 | do | 70 | 125 | Bad. |
| This invention | 3 | Polypropylene ($i$) / Ethylene-vinyl acetate copolymer ($ii$) | 300 / 300 | do | 30 | 45 | Good. |
|  | 4 | Polypropylene ($i$) / Ethylene-vinyl acetate copolymer ($ii$) | 260 / 300 | do | 25 | 35 | Do. |
|  | 5 | Polypropylene ($i$) / Ethylene-vinyl acetate copolymer ($ii$) | 300 / 300 | do | 27 | 36 | Do. |
|  | 6 | Polypropylene ($i$) / Ethylene-vinyl acetate copolymer ($ii$) | 260 / 300 | do | 23 | 30 | Do. |

EXAMPLE 2

The process of this invention was applied to the same resin having a different specific gravity and the results were as follows:

In carrying out the extrusion-lamination of polyethylene (made by Mitsubishi Petrochemical Co. Ltd., Melt Index = 4, Specific Gravity = 0.930) with usual cellophane, polyethylene $ii$ alone was extruded from a conventional extrusion die 2 of the type shown in FIG. 2, and it was also extruded according to the process of this invention from die 21 through manifold 20, slit 20' and outlet orifice 21" together with another polyethylene (made by Mitsubishi Petrochemical Co. Ltd., Melt Index = 4, Specific Gravity = 0.918) separately extruded from manifold 19, slit 19' and outlet orifice 19", then combined together directly below each outlet orifice 19", 20" into melted compounded film and laminated with cellophane $a$. The results of these tests are given in table 2 below.

TABLE 2

| Process | Test No. | Resin | Working temp., °C. | Substrate | Neck, in mm. $W_1-W_2$ | Neck, in mm. $W_1-W_3$ | Adhesion |
|---|---|---|---|---|---|---|---|
| Conventional | 7 | P.E.($ii$) | 310 | Cellophane | 65 | 90 | Good. |
|  | 8 | P.E.($ii$) | 280 | do | 50 | 80 | Bad. |
| This invention | 9 | P.E.($ii$) | 310 | do | 27 | 40 | Good. |
|  | 10 | P.E.($iv$) | 310 | do | 27 | 40 | Good. |
|  |  | P.E.($ii$) / P.E.($iv$) | 280 / 310 | do | 23 | 30 | Do. |

Tests in table 2 were carried out under the following conditions:

Tests No. 7 and No. 8 were conducted under the same condition as tests No. 1 and No. 2 in example 1 with the exception of the working temperature.

Tests Nos. 9 and 10 were conducted under the same condition as Tests No. 3 and No. 4 in example 1 with the exception of the working temperature and rate of extrusion. The rate of extrusion employed was 400 g./min. as to polyethylene $ii$, and 200 g./min. as to polyethylene $iv$.

EXAMPLE 3

In carrying out extrusion-lamination of usual cellophane with polyethylene (made by Phillips Petroleum Co. Ltd., Melt Index = 12, Specific Gravity = 0.958); the tests were carried out in two manners for the sake of comparison, in which the one comprised the extrusion of the above polyethylene alone from a conventional-type extruder die of the type shown in FIG. 2, and the other was effected according to the process of this invention by extruding above polyethylene $d$ from manifold 8 together with low-density polyethylene $e$ (made by Mitsubishi Yuka Co. Ltd., Melt Index = 4, Specific Gravity = 0.918) from manifold 10 by using an extruder die 7 of the type as shown in FIG. 6.

The results of the tests are given in table 3 below:

What is claimed is:

1. In a lamination process for the extrusion coating of a thermoplastic resin film on a substrate comprising the steps of
   a. heating a thermoplastic resin normally subject to neck-in formation,
   b. extruding said resin into a film and,
   c. coating said film, while molten, onto said substrate, the improvement which comprises essentially eliminating said neck-in formation by, in step (b), simultaneously extruding a thermoplastic resin layer less subject to neck-in formation together with said thermoplastic resin to form a multilayer thermoplastic film which is coated onto said substrate in accordance with step (c).

2. The process of claim 1 wherein different thermoplastic resins are employed in the formation of said multilayer thermoplastic film.

3. The process of claim 1 wherein the same thermoplastic resin is employed in at least two of the layers of the multilayer plastic film, said layers being formed at different extrusion temperatures.

4. The process of claim 1 wherein the thermoplastic resin normally subject to neck-in formation is selected from the group consisting of polypropylene, medium-pressure polyethylene, low-pressure polyethylene, high-pressure

TABLE 3

| Process | Test No. | Resin | Working temp., °C. | Substrate | Neck, in mm. $W_1-W_2$ | $W_1-W_3$ | Adhesion |
|---|---|---|---|---|---|---|---|
| Conventional | 11 | P.E. (M.I.=12, S.G.=0.958) | 310 | Cellophane | 80 | 110 | Good. |
| | 12 | P.E. (M.I.=12, S.G.=0.958) | 280 | do | 65 | 87 | Bad. |
| This invention | 13 | 1. P.E. (M.I.=12, S.G.=0.958) 2. P.E. (M.I.=4, S.G.=0.918) | 310 310 | Cellophane | 31 | 45 | Good. |
| | 14 | 1. P.E. (M.I.=12, S.G.=0.958) 2. P.E. (M.I.=4, S.G.=0.918) | 280 310 | do | 26 | 40 | Do. |

NOTE.—P.E.=polyethylene, M.I.=melting index, S.G.=specific gravity. Conditions employed in these tests were the same as those used in Example 2.

EXAMPLE 4

In carrying out the extrusion-lamination of substrate craft paper $a$ with polyethylene (made by Mitsubishi Petrochemical Co. Ltd., Melt Index = 4, Specific Gravity = 0.924), experiments were carried out according to two manners in which the one comprised the extrusion of polyethylene $v$ alone at 310° C., and lamination with matrix $a$ with the use of a conventional extruder die 2 of the type shown in FIG. 2, and the other was conducted according to the process of this invention by extruding the above polyethylene $v$ at 280° C., from slit 9 of die 7 shown in FIG. 6 together with the extrusion of the same polyethylene $v$ at 310° C. The results are given in table 4 in which test No. 15 was conducted under the same conditions as described in tests Nos. 1 and 2 in example 1 with the exception of working temperature, and test No. 16 was conducted under the same conditions as tests Nos. 3 and 4 with the exception of the working temperature.

polyethylene possessing a relatively high specific gravity, polyester and polyvinylidene chloride and the thermoplastic resin layer less subject to neck-in formation comprises a resin selected from the group consisting of high-pressure polyethylene and a copolymer of ethylene with vinyl acetate.

5. The process of claim 1 wherein simultaneous extrusion is accomplished by combining separate resin streams and extruding said combined stream from a single outlet orifice.

6. The process of claim 1 wherein simultaneous extrusion is achieved by extruding each resin stream separately from separate slits in the extrusion dye and combining said separate streams at a point immediately below the outlet orifice of each slit to form the multilayer thermoplastic film.

TABLE 4

| Process | Test No. | Resin | Temp., °C. | Substrate | Neck, in mm. $W_1-W_2$ | $W_1-W_3$ | Adhesion |
|---|---|---|---|---|---|---|---|
| Conventional | 15 | P.E. (v) | 310 | Kraft paper | 30 | 50 | Good. |
| This invention | 16 | P.E. (v) P.E. (v) | 280 310 | do | 25 | 40 | Do. |